Aug. 25, 1953     R. W. GOBLE     2,649,786
WELL BORE CALIPER HAVING LINEAR ELECTRICAL RESPONSE
Filed April 1, 1948     3 Sheets-Sheet 3
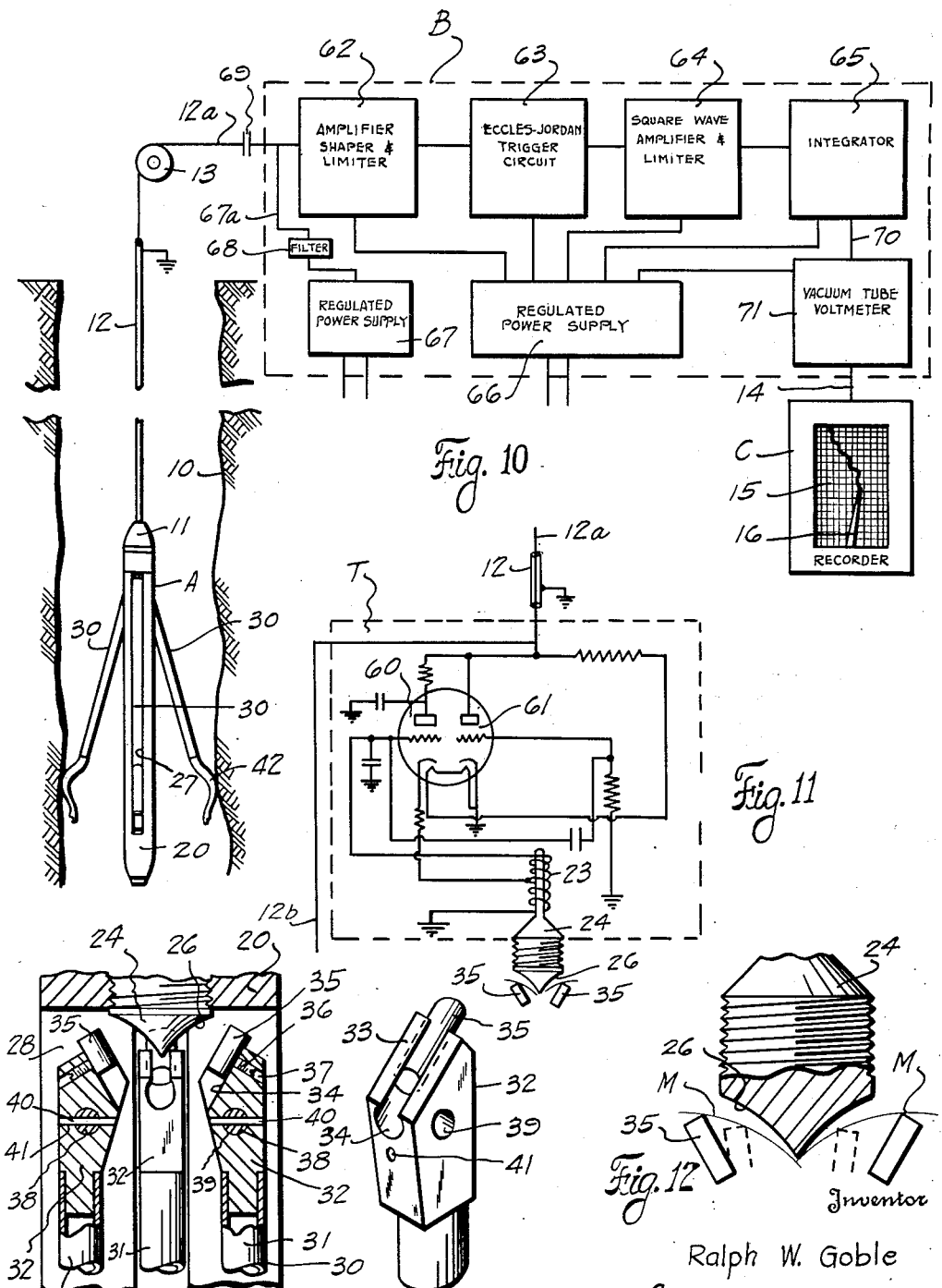
Inventor
Ralph W. Goble
Attorney Patented Aug. 25, 1953

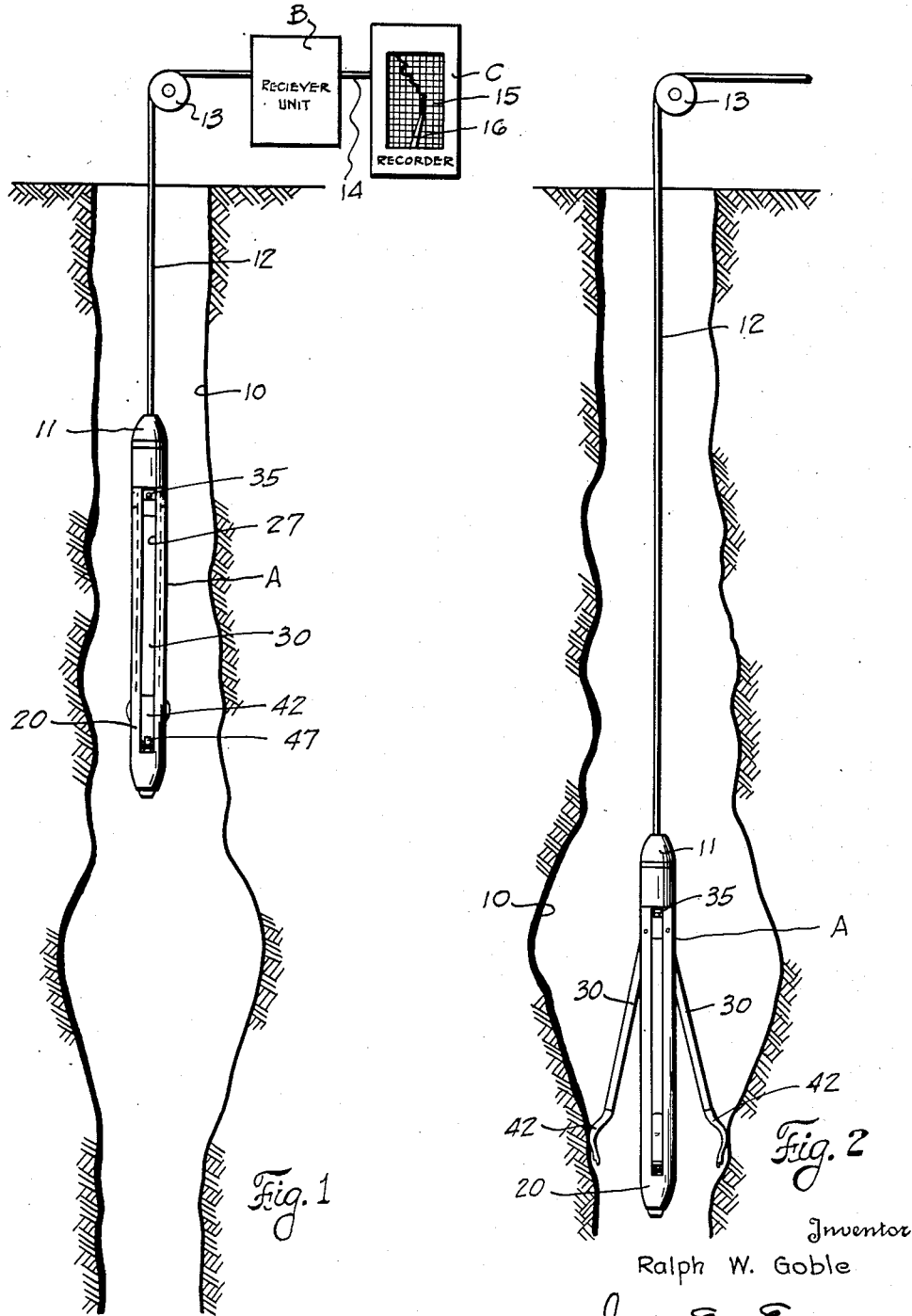

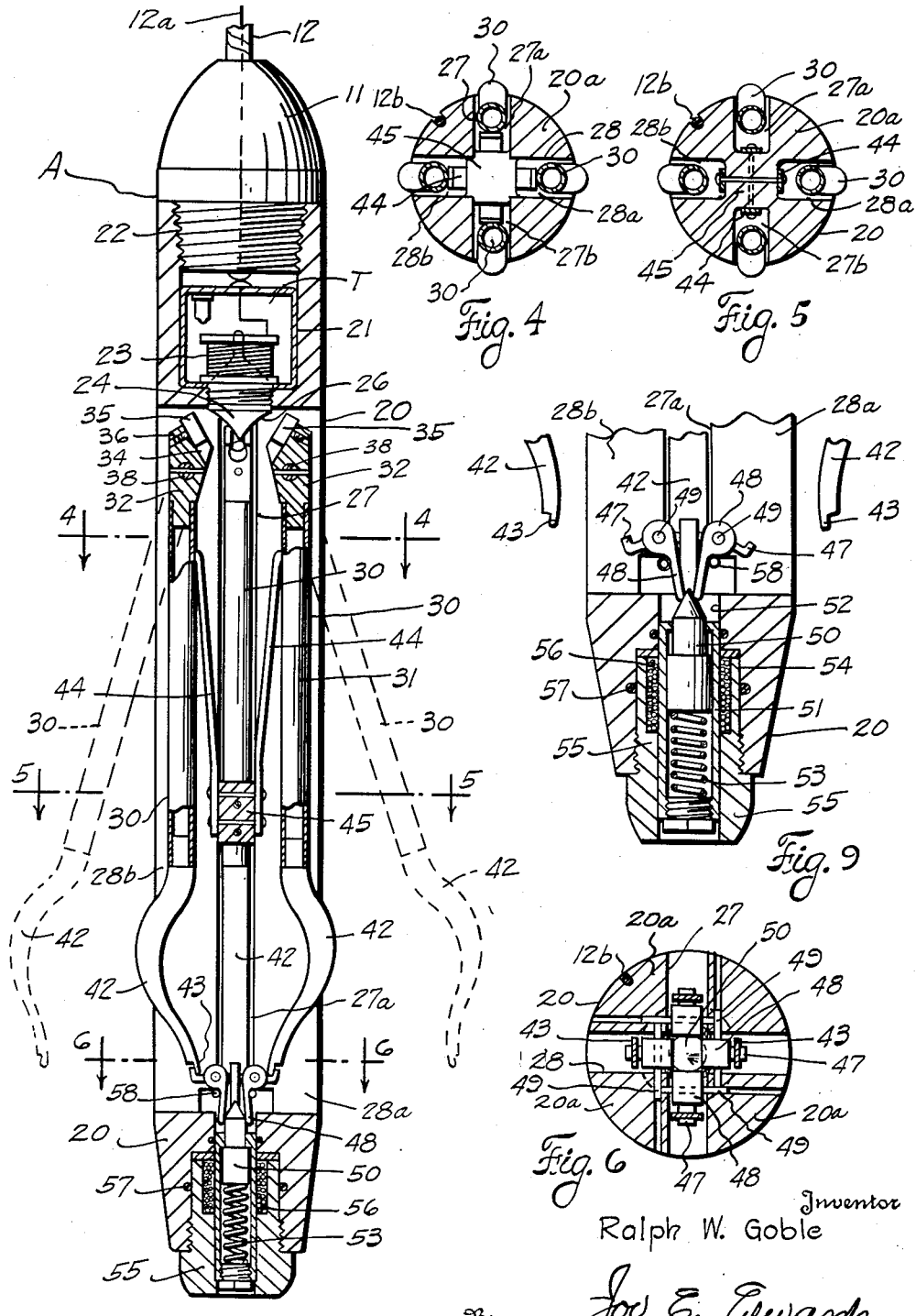

2,649,786

UNITED STATES PATENT OFFICE 2,649,786

WELL BORE CALIPER HAVING LINEAR ELECTRICAL RESPONSE

Ralph W. Goble, Long Beach, Calif., assignor to Eastman Oil Well Survey Company, Denver, Colo., a corporation of Delaware Application April 1, 1948, Serial No. 18,364

11 Claims. (Cl. 33—178)

This invention relates to new and useful improvements in methods of and means for calipering well bores.

One object of the invention is to provide an improved method and apparatus for accurately measuring the diameter or cross-sectional area of a well bore and for simultaneously and continuously recording the measurements being made at the surface of said bore.

An important object of the invention is to provide an improved method for calipering a well bore which includes lowering by means of a single conductor cable a mechanical measuring instrument having movable measuring elements within the well bore, utilizing the movements of said arms as such movements are controlled by the well bore diameter to control the frequency of transmitted electrical pulses, whereby the frequency is representative of the cross-sectional area of the bore being measured, and finally transposing the frequency, as controlled by said arms, into a visible indication at the surface of the cross-sectional area or diameter of the well bore.

Another object of the invention is to provide an improved apparatus for measuring the cross-sectional area of a well bore which includes a measuring instrument adapted to be lowered within the well bore on a single conductor cable and having movable arms engageable with the wall of said bore; said apparatus having a transmitter incorporated within the instrument which transmits electrical pulses to the surface, together with means controlled by the movement of the measuring arms for varying the frequency of the transmitted pulses in accordance with the position of said arms, whereby the frequency of the pulses is representative of the cross-sectional area or diameter of the well bore being measured.

A further object of the invention is to provide a well calipering apparatus, of the character described, wherein the electrical pulses, the frequency of which is representative of the measurement being made are transmitted to surface recording equipment through a single conductor cable and wherein the electrical apparatus is so arranged that the effect of well conditions on the conductor cable are nullified so that an accurate measurement may be carried out.

A still further object of the invention is to provide an apparatus for calipering a well bore wherein electrical pulses are generated and transmitted by a measuring instrument and the frequency of the transmitted current is controlled in accordance with the mechanical movement of measuring arms, together with means at the surface for transposing the variations in frequency, as caused by the measurement being made, into a continuous visible indication of the cross-sectional area of the well bore, the apparatus including means for automatically integrating the movement of the measuring arms so that an accurate average measurement of the positions of all of the measuring arms is obtained.

A particular object of the invention is to provide an improved apparatus, of the character described, wherein the movement of mechanical measuring arms is utilized to vary the intensity of a magnetic field with respect to the core of an electrical coil, whereby the inductance of said coil which is electrically connected in an oscillator circuit is varied to change the rep rate or frequency of the electrical pulses being generated by the oscillator, with the result that the frequency variations are representative of the movement of the measuring arms and are, therefore, representative of the cross-sectional area of the well bore which limits the movement of said arms.

Still another object of the invention is to provide an improved apparatus, of the character described, which may be lowered by means of a single conductor cable which functions not only as the lowering element but also transmits the electrical current from the transmitter in the instrument being lowered, to the surface recording equipment; the apparatus including a single electrical element which is acted upon by a plurality of measuring arms in such manner that the variations produced in said electrical element by the movement of said arms are an average or mean measurement of the positions of all of said arms, whereby the necessity of providing a separate electrical element for each arm is eliminated and the construction simplified.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a sectional view of a well bore illustrating an apparatus, constructed in accordance with the invention being lowered therethrough, Figure 2 is a similar view illustrating the measuring arms moved outwardly to their measurement position and with the measuring instrument ready to move upwardly to make the measurements, Figure 3 is an enlarged, transverse, sectional view of the measuring instrument, Figure 4 is a horizontal, cross-sectional view taken on the line 4—4 of Figure 3.

Figure 5 is a horizontal, cross-sectional view taken on the line 5—5 of Figure 3, Figure 6 is an enlarged, horizontal, cross-sectional view taken on the line 6—6 of Figure 3, Figure 7 is an enlarged, sectional detail showing the pivotal mounting of the measuring arms, Figure 8 is an enlarged, isometric view of the upper end of one of said measuring arms and showing the magnet mounted therein, Figure 9 is an enlarged, sectional detail of the lower end of the instrument and clearly illustrating the latch mechanism, Figure 10 is a block diagram of the surface equipment, Figure 11 is a wiring diagram of the transmitter, and Figure 12 is a schematic view illustrating the movement of the magnets which are carried by the measuring arms with respect to the core of the coil.

In the drawings, the numeral 10 designates a well bore which extends downwardly through the subsurface strata from the ground surface. A well caliper unit or instrument A, which will be hereinafter described in detail, is arranged to be lowered within the well bore and said unit is connected by means of a suitable cable socket 11 to the lower end of a single conductor cable 12, the latter functioning to suspend or support the unit or instrument and at the same time to provide an electrical connection between said unit and the surface equipment. The conductor cable 12 may be of the usual type having an outer sheath which forms an efficient ground and said cable extends upwardly to the surface passing over a suitable sheave or pulley 13 in the derrick (not shown) and has electrical connection with a receiving and measuring unit B. The unit B is connected through a conductor or wire 14 with a suitable recorder C.

The recorder is of standard construction and may be any suitable recording mechanism, said recorder being preferably a photoelectric recorder. The recorder includes a movable tape or chart 15 the movement of which is synchronized with the rate of lowering of the instrument A and a marking stylus 16 is adapted to traverse said tape or chart. Although it is desirable that a photoelectric recorder be employed, it is noted that any suitable electrically actuated recording mechanism may be used. The stylus 16 is electrically controlled in accordance with the operation of the caliper unit or instrument A and receiver B, as will be explained, functions to form a continuous permanent record of the measurement being made.

The unit or instrument A which is arranged to be lowered within the well bore by means of the cable 12 is shown in detail in Figures 3 to 9 and includes a main body 20 which is generally cylindrical in cross-section. The upper portion of the body is formed with a chamber 21 which is adapted to receive a pulse oscillator or an electrical transmitter T and the upper end of the chamber is threaded at 22, whereby the cable socket 11 may be connected therewith. The transmitter T, which will be hereinafter described in detail, is arranged to generate and transmit electrical pulses of a predetermined frequency which are conducted to the surface through a conductor 12a which is housed within the outer grounded sheath of the cable 12. Included as an integral part of the electrical circuit of the transmitter is an electrical coil 23 which has its core 24 threaded within and projecting downwardly through an axial opening 25 which extends from the lower end of the chamber 21. The extreme lower end of the core 24 is reduced or generally conical and said conical surface is curved or slightly concave as indicated at 26.

Below the chamber 21, the body 10 is formed with a transverse slot 27 which extends diametrically therethrough. The slot is elongated in a vertical plane and the body is also formed with a second transversely extending slot 28 which is disposed at a right angle to the slot 27, whereby the areas of the body between the slots form vertically extending struts or sections 20a. The arrangement of the two slots disposed at a right angle to each other within the body provides four guide channels or grooves 27a, 27b and 28a and 28b within which elongate measuring arms 30 are movable. At the intersection of the slots 27 and 28, an axial opening is formed which extends longitudinally through the body and the lower conical end 26 of the core 24 of the transmitter coil 23 is exposed within the upper portion of this axial opening. As is clearly seen in Figures 4 and 5, the transverse slots forming the guide channels 27a, 27b, 28a and 28b project radially from the axis of the cylindrical body 20.

The measuring arms 30 are mounted to move or swing within the guide channels or grooves, one of said arms being mounted within each channel. Four measuring arms have been illustrated but it is obvious that more or less may be employed as desired. Since each measuring arm is constructed in an identical manner, it is believed that a description of one will suffice. Each measuring arm is preferably constructed of a tubular or pipe section 31 having a block 32 suitably mounted or fastened to its upper end. The block 32 is clearly shown in Figure 8 and includes an angular or inclined face 33 having a substantially cylindrical channel or groove 34 therein. A magnet 35 of any suitable magnetic material is mounted within the groove 34 and is held in position therein by a lock stud 36 which threads into an opening 37 formed in the block and which has its inner end engaged with the magnet to frictionally lock the latter in its groove. The block 32 at the upper end of each measuring arm is fastened within the upper end of one of the guide channels or grooves within the body 20 by means of a pivot bolt 38 which extends through a transverse opening 39 formed in the block, the ends of said bolt being pivoted within the vertical struts or sections 20a of the main body 20. A suitable locking pin 40 may be inserted within an opening 41 in the block and may extend through a hole in the pivot bolt 38 (Figure 7) to maintain said bolt in position. The lower end of the tubular section 31 of each measuring arm has a curved wear shoe 42 secured thereto and the lower end of said shoe is provided with a latching lug or projection 43.

Since the magnet 35 of each measuring arm 30 is carried by the upper end thereof, it will be evident that when the measuring arm is swung on its pivot bolt 38, the magnet 35 at the upper end thereof will be swung inwardly toward the core 24 of the coil 23 which, as has been explained, forms part of the transmitter circuit. As the magnets of the measuring arms 30 move with respect to the core 24, the inductance of the coil is varied. This variation is accomplished by the application of the external magnetic field of the magnets 35 to the core of said coil which saturates said core to a more or less extent and this variation results in a change in the inductance of the coil which is proportional to the applied magnetic field. The magnets of the measuring arms are all of the same strength and intensity so that each magnet will cause the same change in coil inductance as the other magnets upon the same amount of movement.

The measuring arms 30 are normally urged toward an outer position with respect to the body by leaf springs 44 which springs are disposed within the various guide channels 27a, 27b, 28a and 28b within which the arms are mounted. The lower ends of the springs 44 are secured to a block 45 which is either fastened within the axial opening in the body formed at the intersection of the slots 27 and 28 or which is made integral with the struts or sections 20a of said body. Normally the upper ends of the leaf springs engage the arms 30 and tend to urge said arms outwardly at all times.

For latching the lower ends of the arms inwardly to permit lowering of the instrument downwardly through the well bore, the curved wear shoe 42 which is secured to the lower end of each arm is provided with the latching lug or projection 43. This projection is adapted to be engaged by a keeper 47 which projects outwardly from a pivoted latch member 48. One latch member is provided for each arm and each member is mounted on a suitable pivot pin 49 which has its ends journaled in the body 20.

The lower ends of the latches 48 are normally engaged by the conical upper end of a plunger 50 which is movable within a sleeve 51, the latter being disposed within an axial bore 52 formed in the extreme lower end of the body 20. The plunger 50 is normally urged upwardly between the latches 48 by a coil spring 53.

The bore 52 is counter-bored or enlarged as illustrated at 54 in Figure 9 and a plug member 55 is arranged to engage within the counterbore with its lower portion threaded into the body 20. A solenoid coil 56 is carried by the plug member and when the plug is in position within the body, the solenoid coil surrounds the plunger 50 whereby said plunger forms the core of said solenoid. A suitable packing ring 57 seals off the joint between the plug 55 and the body.

Normally the coil spring 53 urges the plunger upwardly between the latches 48 (Figure 3), whereby the keepers 47 of said latches may engage the latching projections 43 on the shoes 42 of the arms 30. Electrical current is conducted downwardly from the conductor 12a through a conductor 12b to the solenoid coil 56, with the latter extending downwardly through a vertical groove formed in one of the struts 20a of the body 20. After the instrument has been lowered into proper position within the well bore and the arms 30 are to be released, an electrical current is conducted to the solenoid coil 56. When the coil is energized, the plunger or core 50 is retracted or moved downwardly within the sleeve 51, whereby its conical upper end moves downwardly from between the latches 48. An annular garter spring 58 which encircles the latches 48 moves the lower portion of said latches inwardly as soon as the upper end of the plunger is retracted from between the latches, whereby said latches swing about their pivots and disengage the keepers 47 from the projections 43 of the measuring arms. As soon as the keepers are disengaged from the projections 43, the leaf springs 44 function to automatically swing the measuring arms outwardly until the curved shoes 42 at the lower end thereof engage the wall of the well bore 10. As the arms move outwardly into engagement with the wall of the well bore, the magnets 35 at the upper ends of the measuring arms will swing with respect to the core 24 of the coil 23, which coil forms part of the transmitter T. Obviously the magnetic influence of the magnets 35 on the core 24 will be directly proportional to the position of the arms 30 and, therefore, the particular magnetic influence affecting the core will be representative of the cross-sectional area of the bore. The inductance variation which is caused in the coil by the magnetic influence of the magnets 35, is then utilized through the electrical mechanism to actuate the surface recording equipment and thereby record the positions of the arms and the cross-sectional area of the well bore.

A wiring diagram of the transmitter is shown in Figure 11 and said transmitter comprises an electron coupled oscillator which is saturated or overdriven to draw maximum plate current almost instantaneously to thereby produce a wave train. The circuit includes an oscillator section 60 and an amplifier and limiter section 61. The coil 23 forms an integral part of the oscillator circuit and any variation in the inductance of this coil, results in a variation of the frequency or rep rate of the generated pulses. When the transmitter is operated, the circuit begins to oscillate and functions similarly to a blocking oscillator due to the bias on the oscillator circuit. However, the tube is so biased that the plate voltage appears as negative pulses on the line or conductor and these negative pulses are conducted upwardly through the line 12a to the surface equipment.

As has been stated, the magnets 35 which are carried by the measuring arms are movable with respect to the core 24 of the coil 23. These magnets, in effect, apply an external magnetic field to the core to saturate the core to a greater or lesser degree, such saturation resulting in a change in the inductance value of the coil. The change or variation in inductance is directly proportional to the applied magnetic field and therefore, as the magnets move closer to or farther from the core, the inductance of the coil is changed proportionately to produce a change in the frequency of the pulses being generated by the oscillator circuit. When the arms are latched inwardly during lowering of the instrument within the well bore, the magnets are spaced their greatest or maximum distance from the core and this will be referred to as zero position. At this point the inductance of the coil is maximum and the frequency of the pulses is at a minimum because there is less saturation of the core. As the magnets are moved closer to the core and the air gap therebetween decreases, the saturation of the core increases to decrease inductance of the coil and thereby increase the frequency of the transmitted pulses in accordance with the particular position of the magnets.

It is well known that the intensity of a magnetic field with respect to a core surface will normally vary as the square of the distance of the magnet path or the movement of the magnet varies. This means that if the surface of the core 24 was substantially flat and the magnet was moved toward and away from this flat surface, the change in inductance would not be linear or in proportion to the movement of the magnet but rather would be on a curved line. In other words, if the magnet moved one-sixteenth of an inch toward the core, a certain inductance variation would occur but upon the second one-sixteenth inch movement, the inductance variation during such second movement would not be the same as it was in the first movement. In order to cause the variation in inductance and, therefore, the variation in frequency to be directly proportional to the actual movement of the magnets, it is necessary that the lower end of the core 24 have a curved or concave surface as is illustrated in Figure 12. The radius of the curve of this surface must be different from the arc M through which the magnets 35 move in order that the air gap between each magnet and the core gradually decreases along a curved line. The relationship between the arc of the curved surface of the core with respect to the arc M is such that the variation in inductance caused by movement of the magnets is at all times directly proportional to the movement of the measuring arms 39. Thus, each inch of movement of the measuring arms results in a substantially identical change in the inductance value of the coil throughout the entire range of movement of each arm. This is an important feature of the invention since it produces a frequency change in the transmitted pulses which change is linear or directly proportional to the movement of the measuring arms.

There are various recording mechanisms which may be employed for measuring the frequency of the transmitted pulses and for transposing them into visible indications which are representative of the cross-sectional area of the well bore. However, a preferred form of surface apparatus is illustrated in Figure 10. The conductor 12a is electrically connected at the surface to a counter circuit or frequency meter which includes an amplifier, shaper and limiter 62, an Eccles-Jordan trigger circuit 63, a square wave amplifier and limiter 64 and an integrator 65, all of these units being supplied with power by a regulated power supply 66. Power for operating the transmitter T is supplied from a power supply 67 which is located at the surface and which has connection through a wire 67a with the conductor 12a. A suitable filter 68 is connected in the wire 67a to prevent the transmitted pulses from flowing into the power supply while a blocking condenser 69 is connected in the conductor 12a to prevent the supply voltage from passing into the receiving unit B. The frequency meter has connection through a wire 70 with a vacuum tube voltmeter 71 and the latter is electrically connected through the wire 14 with the recorder C and controls the operation of its stylus 16.

The negative pulses which are generated by the transmitter are conducted upwardly through the cable 12a and flow through the amplifier, shaper and limiter 62. This unit is provided for the purpose of returning the negative pulses to their original pattern or wave form; that is, to the same form which they had when they left the transmitter T and prior to the time that they were affected by the conductor 12a. In addition, the unit 62 limits the pattern or shape of the pulses to provide uniformity of pattern and simultaneously amplifies said pulses.

From the unit 62, the negative pulses travel to the Eccles-Jordan trigger circuit which functions to convert the wave form into a square wave. It might be noted that the trigger circuit is sensitive only to negative pulses since, as has been pointed out, the transmitter preferably generates and transmits only negative pulses. After the negative pulses have been converted into a square wave pattern, they flow through the square wave amplifier and limiter 64 which functions to amplify and limit said square waves. From this unit the waves are directed to the integrator 65 which, as is well known, rectifies the square waves and transposes them so they will have an amplitude which is directly proportional to the frequency of the pulses and it is these rectified and transposed waves which are utilized to actuate the vacuum tube voltmeter 71. The vacuum tube voltmeter being coupled to the recorder controls the operation of the stylus 16 and since the amplitude of the wave which operates the voltmeter is directly proportional to the frequency of the negative pulses and also since said frequency is controlled in accordance with the position of the measuring arms 30, it will be evident that the amplitude will vary in direct ratio to any variation or change in the position of the measuring arms. Thus, the varying amplitude is a direct measure of the varying frequency which, in turn, is representative of the cross-sectional area of the well bore 10 and, therefore, it becomes obvious that the stylus 16 provides a visible continuous record of the variation in the cross-sectional area of the bore as said bore is traversed by the measuring arms 30.

In the operation of the apparatus, the measuring instrument A has its measuring arms 30 latched in their inner positions, the lower ends of said arms being engaged by the keepers 47 of the pivoted latches 48. The instrument is then connected to the conductor cable and is lowered downwardly through the well bore to the lower end thereof. Upon reaching the point at which measurement is to be started, a suitable switch (not shown) at the surface is closed to supply the required power for operation from the power supply 67. The electrical current flows downwardly through the conductor 12a and through the auxiliary conductor 12b to the solenoid coil 56 at the lower end of the instrument. Energization of the coil 56 results in a downward movement of the plunger 50 which moves said plunger from between the latches 48 so that the spring 58 surrounding said latches may disengage the keepers from the measuring arms 30. The leaf springs 44 behind said measuring arms immediately swing said arms outwardly to engage the shoes 42 of said arms with the wall of the well bore. The transmitter T is of course placed into operation by the power supplied through cable 12a and generates pulses which, as explained, are preferably negative pulses.

At the time that the arms 30 are latched in their inner positions, the frequency of the pulses being transmitted is such that the stylus 16 of the surface recorder is at zero position. As soon as the arms 30 are released and swing outwardly, the magnets 35 at their upper ends move inwardly toward the core 24 of the coil 23 which is electrically connected in the oscillator circuit. This reduces the air gap between the magnets 35 and the curved lower end 26 of the core 24 and the change in the external magnetic field which is applied to the core results in a change in the inductance value of said coil. As explained, the change in inductance of the coil 23 produces a change in the frequency of the pulses being transmitted to the surface, whereby the stylus 16 is moved in accordance with such change to indicate the position of the arms. By properly calibrating the chart 15 over which the stylus moves, the stylus may record the actual cross-sectional area of the well bore.

It is, of course, evident that the instrument A may not be exactly centered axially within the well bore but since all four magnets are of the same strength and are located in the same position when the measuring arms 30 are retracted, an automatic integration will be accomplished. In other words, if the instrument is at one side of the bore, one of said arms will not move outwardly as far as the arm directly opposite; however, the diametrically opposed arm will move twice as far as it would have if the instrument were centered in the bore and, therefore, an automatic integration is obtained so that the inductance change which occurs in the coil 23 is an average of the movement of all of the measuring arms 30.

The change in the inductance of the coil is made proportional to the movement of the magnets 35 by the arrangement which swings the magnets in an arc M which is different from the arc of the curved surface 26 of the core 24. As has been pointed out, the intensity of the magnetic field with respect to the core surface would normally vary as the square of the distance of the movement of the magnet changes, which would cause the inductance change in the coil to be other than linear or directly proportional to the magnet movement. By arranging each magnet to move in an arcuate path which is not coaxial with the arcuate surface of the core, the variation in the air gap between the magnet and the core is such that a given movement of the magnet will result in a given change in the inductance of the coil.

After the arms are released and engaged with the wall of the well bore, the instrument A is moved upwardly through the well bore and the shoes 42 of the measuring arms ride on the wall of the bore. During such upward movement the arms will move inwardly and outwardly in accordance with the particular contour of the well bore and thus the positions of the magnets 35 at the upper ends of said arms will constantly vary with respect to the core 24 of the coil. It thus becomes obvious that the inductance of the coil is constantly varied in direct proportion to the movement of the measuring arms and the electrical pulses which are constantly transmitted by the oscillator circuit of the transmitter T have their frequency controlled by this varying inductance. The pulses are conducted to the surface equipment and are converted so as to have an amplitude which operates the vacuum tube voltmeter. As explained, the amplitude of the converted pulses is a direct measure of the frequency change and, therefore, the stylus 16 of the recorder is actuated to indicate the changing positions of the measuring arms 30. Movement of the tape or chart 15 is, of course, synchronized with the rate of movement of the instrument A and thus the stylus provides a continuous visible record on the chart of the cross-sectional area of the well bore. After the instrument A has traversed the well bore and reaches the surface, the stylus will have formed a continuous record of the cross-sectional area or diameter of the well bore throughout its entire length.

The particular important feature of the present invention resides in the arrangement of the magnets and their relationship to the core 24 of the coil 23, whereby the frequency of the transmitted electrical pulses may be varied in direct proportion to the movement of the measuring arms. The arms are, of course, exposed to any fluids which may be within the well bore and the particular construction and arrangement of parts substantially eliminates any sealing problems since there is no direct operative connection between the arms and electrical coil or its core. Also, by utilizing the variation in frequency as the means for actuating the recording mechanism, the temperature or other well conditions which might ordinarily affect the conductor cable do not interfere with accurate measurements. The cable is, of course, employed as the means for lowering the instrument A and also as an electrical conductor.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A well caliper apparatus for measuring the cross-sectional area of a well bore including, a measuring instrument comprising, an elongate body adapted to be lowered within a well bore, a plurality of measuring arms movably mounted on said body and normally urged toward an outward position whereby said arms engage the wall of the well bore and are moved inwardly and outwardly of the body in accordance with variations in the well bore diameter, an electrical transmitter mounted in the body and having means for generating and transmitting electrical pulses of a predetermined frequency, an electrical coil having a core and being connected in the electrical circuit of the transmitter and functioning to vary the frequency of the transmitted electrical pulses when the inductance of said coil is varied, magnetic means carried by the measuring arms and movable with respect to the core of said coil when the arms are moved by variations in the cross-sectional area of the well bore, whereby the magnetic influence of the magnetic means on the core of the coil varies to change the inductance of the coil and thereby vary the frequency of the transmitted pulses in accordance with the movement of the measuring arms, said measuring arms being mounted so that the movement of the magnetic means is on a curved line with respect to the surface of the core of the coil and further the surface of the core has such a curvature with respect to the line of movement of the magnetic means that the variation in inductance of the coil and the resultant variation in the frequency of the transmitted pulses is linear and in direct proportion to the amount of movement of the measuring arms.

2. A well caliper apparatus for measuring the cross-sectional area of a well bore including, a measuring unit adapted to be moved longitudinally within the well bore and comprising, an elongate body having a closed chamber therein, an electrical transmitter mounted within the chamber for generating and transmitting an electrical current, means connected in the electrical circuit of the transmitter for varying the transmitted current, said last-named means including a portion projecting from said chamber, measuring elements movably mounted on the body outside of the chamber and adapted to engage the wall of the well bore, the end of each measuring element being adjacent the current varying means, and magnetic means attached to the end of each measuring element and movable with respect to the projecting portion of the current varying means to cause said means to vary the characteristics of the electrical current in accordance with the movement of the arms.

3. A well caliper apparatus for measuring the cross-sectional area of a well bore including, a measuring instrument comprising, an elongate body adapted to be lowered within a well bore, a plurality of measuring elements having their upper portions pivotally mounted on the body, said body having a closed chamber therein above the measuring elements, an electrical transmitter mounted within the chamber and having means for generating and transmitting electrical current, an electrical coil connected in the circuit of the transmitter and having a core, a portion of said core projecting from the chamber in close proximity to the upper ends of the measuring elements, and magnetic means carried by the upper ends of the measuring elements and movable with respect to the core as the measuring elements are swung, whereby movement of said elements results in variations in the magnetic influence to which the core is subjected and thereby produces variations in the transmitted electrical current.

4. A well caliper apparatus as set forth in claim 3, wherein the shape of the outer surface of the projecting end of the core is in predetermined relationship to the arcuate path through which each magnetic means on each measuring element travels, said arcuate path of travel being along a curved line with respect to the outer surface of the projecting end of the core of the coil to produce a linear variation in the electrical current which variation is in direct proportion to the amount of movement of the measuring elements.

5. A well caliper apparatus for measuring the cross-sectional area of a well bore including, a measuring instrument comprising, an elongate body adapted to be lowered within a well bore, a plurality of measuring arms movably mounted on said body and normally urged toward an outward position whereby said arms engage the wall of the well bore and are moved inwardly and outwardly of the body in accordance with variations in the well bore diameter, an electrical transmitter mounted in the body and having means for generating and transmitting electrical pulses of a predetermined frequency, an electrical coil having a core and being connected in the electrical circuit of the transmitter and functioning to vary the frequency of the transmitted electrical pulses when the inductance of said coil is varied, magnetic means carried by each of the measuring arms and movable with respect to the core of said coil when the arms are moved by variations in the cross-sectional area of the well bore, whereby the magnetic influence of the magnetic means on the core of the coil varies to change the inductance of the coil and thereby vary the frequency of the transmitted pulses in accordance with the movement of the measuring arms, means for mounting the measuring arms to cause the magnetic means carried by each arm to move along a curved path with respect to the surface of the core of the coil whereby as each magnetic means is moved with respect to the surface of the core the spacing between said magnetic means and core is varied to vary the magnetic influence of said means upon said core.

6. A well caliper apparatus for measuring the cross-sectional area of a well bore including, a measuring instrument comprising, an elongate body adapted to be lowered within a well bore, a plurality of measuring arms having their upper portions pivotally mounted on the body and spaced radially about said body, an electrical transmitter having means for generating and transmitting electrical current mounted in the body, an electrical coil connected in the transmitter circuit and having a core which is disposed axially of the body in close proximity to the upper ends of the measuring arms, and a magnet secured to the upper end of each arm and movable with respect to the outer surface of the core of the coil to subject the core to magnetic influence and vary the inductance of the coil to thereby vary the characteristics of the electrical current in accordance with the position of the measuring arms.

7. A well caliper apparatus as set forth in claim 6, wherein the arcuate path along which the magnets travel is non-parallel to the outer surface of the core of the coil whereby as each magnet is moved with respect to the surface of the core the spacing between said magnet and the core is varied to vary the magnetic influence of the magnets upon said core in a desired manner.

8. A well caliper apparatus for measuring the cross-sectional area of a well bore including, a measuring instrument comprising, an elongate body adapted to be lowered within a well bore, a plurality of measuring arms having their upper portions pivotally mounted on the body and spaced radially about said body, an electrical transmitter having means for generating and transmitting electrical current mounted in the body, an electrical coil connected in the transmitter circuit and having a core which is disposed axially of the body in close proximity to the upper ends of the measuring arms, a magnet secured to the upper end of each arm and movable with respect to the outer surface of the core of the coil to subject the core to magnetic influence and vary the inductance of the coil to thereby vary the characteristics of the electrical current in accordance with the position of the measuring arms, and measuring and recording means at the surface of the well bore and electrically connected with the transmitter for measuring the variations in the transmitted current and for transposing said variations into visible indications of the cross-sectional area of the well bore.

9. A well caliper for measuring the cross-sectional area of a well bore including, a measuring instrument comprising, an elongate body adapted to be lowered within a well bore, a plurality of measuring arms having their upper portions pivoted within the body and spaced in various radial positions about the body, an electrical transmitter mounted in the body and having means for generating and transmitting electrical pulses of a predetermined frequency, an electrical coil connected in the electrical circuit of the transmitter and having a core which has a portion thereof disposed axially within the body in close proximity to and between the upper ends of the measuring arms, said coil functioning to vary the frequency of the transmitted electrical pulses when the inductance of said coil is varied, and a magnet carried by the upper end of each measuring arm and movable with respect to the outer surface of the core when the arm is moved, whereby the magnetic influence of the magnets on the core of the coil is varied to vary the inductance of the coil to thereby change the frequency of the transmitted pulses when the measuring arms are swung to different positions.

10. A well caliper apparatus as set forth in claim 9, wherein that portion of the core which is in close proximity to the upper ends of the measuring arms has an outer surface which is arcuately shaped and also wherein the path through which the magnets move is non-parallel to the arcuate outer surface of the core so that swinging of the magnets relative to the core varies the spacing between the magnets and core throughout the travel of said magnets.

11. A well caliper apparatus as set forth in claim 9, together with measuring and recording means at the surface of the well bore electrically connected with the transmitter for measuring the variations in frequency of the electrical pulses and for transposing said variations into visible indications of the cross-sectional area of the well bore.

RALPH W. GOBLE.

References Cited in the file of this patent

UNITED STATES PATENTS

| Number | Name | Date |
|---|---|---|
| 1,792,249 | Serduke | Feb. 10, 1931 |
| 1,943,619 | Mudge et al. | Jan. 16, 1934 |
| 1,999,215 | Smith | Apr. 30, 1935 |
| 2,150,070 | Kregecz | Mar. 7, 1939 |
| 2,235,533 | Roberts | Mar. 18, 1941 |
| 2,267,110 | Kinley et al. | Dec. 23, 1941 |
| 2,281,960 | Vacquier | May 5, 1942 |
| 2,322,343 | Brandon | June 22, 1943 |
| 2,370,818 | Silverman | Mar. 6, 1945 |
| 2,379,996 | Silverman | July 10, 1945 |
| 2,387,496 | Cornelius | Oct. 23, 1945 |
| 2,392,357 | Bays | Jan. 8, 1946 |
| 2,415,636 | Johnson | Feb. 11, 1947 |
| 2,421,933 | Goldstine | June 10, 1947 |
| 2,447,098 | Silverman | Aug. 17, 1948 |
| 2,497,990 | Huber et al. | Feb. 21, 1950 |
| 2,502,775 | Brandon | Apr. 4, 1950 |
| 2,514,355 | Barnes | July 11, 1950 |
| 2,534,632 | A. Smith | Dec. 19, 1950 |
| 2,547,876 | Krasnow | Apr. 3, 1951 |